United States Patent
Milewicz et al.

(10) Patent No.: US 8,047,328 B1
(45) Date of Patent: Nov. 1, 2011

(54) PLASTIC MUFFLER AND METHOD FOR MAKING SAME

(76) Inventors: Mark Milewicz, Metamora, MI (US); Colin Murdock Drewek, Marysville, MI (US)

(*) Notice: Subject to any disclaimer, the term of this patent is extended or adjusted under 35 U.S.C. 154(b) by 0 days.

(21) Appl. No.: 12/903,518

(22) Filed: Oct. 13, 2010

Related U.S. Application Data

(60) Provisional application No. 61/353,013, filed on Jun. 9, 2010.

(51) Int. Cl.
*F01N 1/08* (2006.01)
*F01N 13/08* (2010.01)
*F01N 13/16* (2010.01)
*F01N 13/18* (2010.01)
*F16L 9/18* (2006.01)

(52) U.S. Cl. ........ 181/246; 181/228; 181/265; 181/282; 138/113

(58) Field of Classification Search .................. 181/246, 181/228, 265, 282; 138/113
See application file for complete search history.

(56) References Cited

U.S. PATENT DOCUMENTS

| | | | | |
|---|---|---|---|---|
| 2,573,474 A * | 10/1951 | Marx | | 184/47 |
| 3,209,862 A * | 10/1965 | Young | | 181/245 |
| 3,523,590 A * | 8/1970 | Straw | | 181/282 |
| 3,574,358 A * | 4/1971 | Cassel | | 285/53 |
| 3,608,667 A * | 9/1971 | Foster | | 181/282 |
| 3,966,014 A * | 6/1976 | Gowing | | 181/229 |
| 3,974,862 A * | 8/1976 | Fuhrmann | | 138/37 |
| 4,280,535 A * | 7/1981 | Willis | | 138/112 |
| 4,336,864 A * | 6/1982 | Asaka et al. | | 181/241 |
| 4,576,247 A * | 3/1986 | Thorpe | | 181/243 |
| 4,993,513 A * | 2/1991 | Inoue et al. | | 181/282 |
| 5,148,597 A * | 9/1992 | Weeks | | 29/890.08 |
| 5,340,952 A * | 8/1994 | Takiguchi | | 181/282 |
| 5,497,810 A * | 3/1996 | Berger et al. | | 138/113 |
| 5,559,308 A * | 9/1996 | Hayashi | | 181/265 |
| 5,803,127 A * | 9/1998 | Rains | | 138/113 |
| 5,955,707 A * | 9/1999 | Fritz | | 181/282 |
| 6,019,648 A * | 2/2000 | Lecours et al. | | 440/38 |
| 6,152,350 A * | 11/2000 | Hayashi et al. | | 228/102 |
| 6,419,280 B2 * | 7/2002 | Uegane et al. | | 285/300 |
| 6,543,577 B1 * | 4/2003 | Ferreira et al. | | 181/282 |
| 6,826,834 B2 * | 12/2004 | Wu et al. | | 29/890.08 |
| 6,863,154 B2 * | 3/2005 | Uegane et al. | | 181/207 |
| 7,007,720 B1 * | 3/2006 | Chase et al. | | 138/110 |
| 7,458,440 B2 * | 12/2008 | Uegane | | 181/228 |
| 7,686,131 B1 * | 3/2010 | Osterkamp et al. | | 181/227 |
| 7,810,609 B2 * | 10/2010 | Sikes et al. | | 181/250 |
| 2005/0023076 A1 * | 2/2005 | Huff et al. | | 181/246 |
| 2007/0240932 A1 * | 10/2007 | Van De Flier et al. | | 181/228 |
| 2010/0307863 A1 * | 12/2010 | Van De Flier et al. | | 181/252 |

* cited by examiner

*Primary Examiner* — Elvin G Enad
*Assistant Examiner* — Christina Russell
(74) *Attorney, Agent, or Firm* — Gifford, Krass, Sprinkle, Anderson & Citkowski, P.C.

(57) ABSTRACT

A muffler adapted for connection with an exhaust pipe of an internal combustion engine which has an outer housing constructed of a plastic material. The housing has an inlet and at least one inwardly protruding rib extends around the interior of the housing inlet. The rib is constructed of a plastic material and forms an opening complementary in shape, but smaller in cross-sectional area, than the outer periphery of the exhaust pipe. The exhaust pipe is inserted into the inlet and the exhaust pipe and housing are vibrated relative to each other for a time period sufficient to at least partially melt the rib and cause the rib to seal around the exhaust pipe upon cooling.

8 Claims, 1 Drawing Sheet

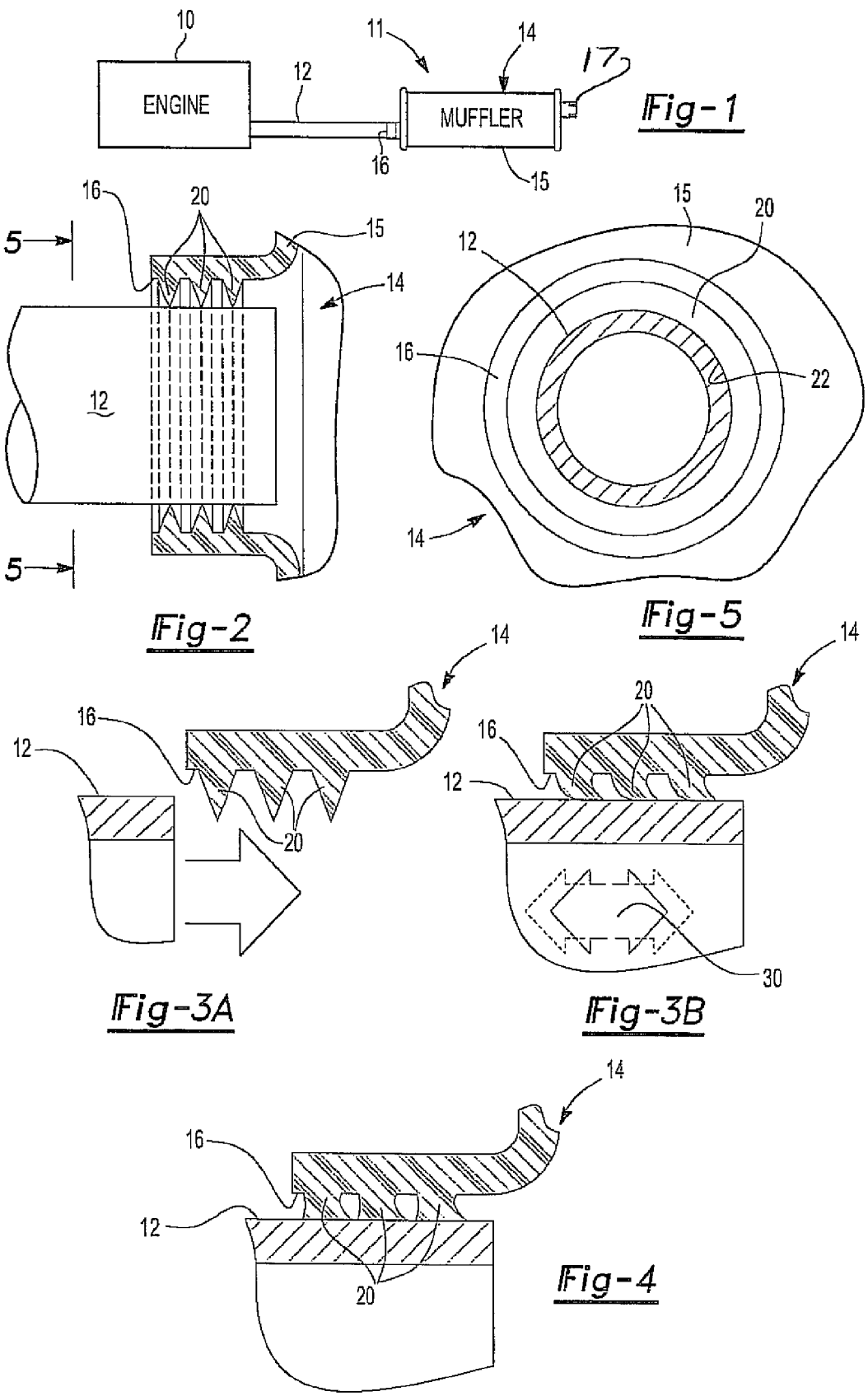

PLASTIC MUFFLER AND METHOD FOR MAKING SAME

CROSS REFERENCE TO RELATED APPLICATIONS

This application claims priority of U.S. Provisional Patent Application Ser. No. 61/353,013 filed Jun. 9, 2010, which is incorporated herein by reference.

BACKGROUND OF THE INVENTION

I. Field of the Invention

The present invention relates generally to mufflers of the type which is connected to the exhaust pipe of an internal combustion engine.

II. Description of Related Art

A major goal of automotive manufacturers when selecting components used in the manufacture of the automotive vehicle is to select components that are both inexpensive and lightweight. The use of inexpensive components reduces the overall manufacturing cost of the vehicle while lightweight components improve fuel efficiency and reduce fuel consumption.

The muffler forms one component for automotive vehicles driven by internal combustion engines which is both relatively heavy and relatively expensive. As such, the cost of the muffler for an internal combustion engine driven automotive vehicle forms a significant part of the overall cost of the vehicle and also plays a significant factor in the fuel efficiency for the vehicle.

In order to reduce both the cost and weight of the muffler, there has been increased interest in developing a muffler having a housing that is constructed of a plastic, i.e. synthetic material, in view of both the low weight and low cost of such plastic material. Furthermore, plastic materials may be inexpensively molded as opposed to metal stamping commonly used to construct metal muffler housings.

In order to minimize the leakage of both exhaust products as well as noise from the muffler, it is necessary that a good seal be created between the exhaust pipe from the engine and the corresponding inlet to and outlet from the plastic muffler. While ideally the inlet to the plastic muffler would be dimensioned to snugly fit around the exhaust pipe, due to manufacturing tolerances for both the inlet as well as the exhaust pipe, it is difficult to achieve a snug fit between the exhaust pipe and the inlet and outlet to a plastic muffler that is sufficient to meet the automotive noise and exhaust leakage requirements of the automotive industry.

Consequently, there have been previous attempts to seal the exhaust pipe to the inlet and outlet of a plastic muffler by utilizing seals, gaskets, mastics, glues, adhesives, mechanical fasteners, and the like. All of these sealing methods, however, have their own disadvantages.

For example, the use of a gasket or a seal creates an additional component and thus an additional cost for the vehicle. Similarly, the use of glue, adhesives, etc. to seal the exhaust pipe to the inlet and outlet of a muffler having a plastic housing also increases the overall cost of the muffler system due to the cost of the glues or adhesives. Furthermore, the use of glues, adhesives, etc. also creates additional assembly time to construct the automotive vehicle thus increasing the overall manufacturing cost.

SUMMARY OF THE PRESENT INVENTION

The present invention provides both a muffler having a plastic housing as well as a method for joining a muffler having a plastic housing to an exhaust pipe for a custom seal which overcomes the above-mentioned disadvantages of the previously known attempts to design a muffler having a plastic housing.

In brief, the exhaust pipe from the internal combustion engine is typically round in cross-sectional shape and has a known outside diameter, at least within the manufacturing tolerances. The exhaust pipe is also made of metal, typically steel, which is necessary to resist the high heat from the internal combustion engine as well as to withstand the mechanical stress imposed on the exhaust pipe during the operation of the internal combustion engine.

The muffler of the present invention includes a plastic housing with both an inlet and an outlet. The inlet is adapted for connection with the exhaust pipe from the internal combustion engine while the outlet is connected to exhaust piping to exhaust the exhaust stream from the vehicle. Furthermore, as used herein, the term "plastic" means a nonmetallic material, such as a synthetic polymer.

At least one inwardly protruding rib extends around the interior of the housing inlet and outlet. This rib is also constructed of a plastic material and is preferably of a one piece construction with the muffler housing. The rib also defines an opening that is complementary in shape, but smaller in cross-sectional area, than the outer periphery of the exhaust pipe.

In order to attach the exhaust pipe to the inlet and outlet, the exhaust pipe is inserted into the inlet or outlet. Since the cross-sectional area defined by the rib is less than the outer periphery of the exhaust pipe, the ribs are constructed of a malleable material that will deflect and allow the exhaust pipe to pass through the rib or ribs by deforming them.

In order to seal the ribs, and thus the muffler inlet, to the housing, the exhaust pipe and muffler housing are longitudinally or axially vibrated toward and away from each other. This vibration and the resulting rubbing contact between the rib and the outer periphery of the exhaust pipe increases the temperature of the ribs sufficiently such that the ribs partially melt and conform to the outer periphery of the exhaust pipe. When the vibration between the muffler housing and the exhaust pipe is terminated, the ribs cool in their now deformed state thus sealing the muffler inlet to the exhaust pipe.

Consequently, by proper design and dimensioning of the ribs, mechanical interference between the rib and the outer periphery of the exhaust pipe is achieved despite variations in the size of the exhaust pipe and/or muffler housing inlet and outlet due to manufacturing tolerances.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view of an engine and the muffler of the present invention;

FIG. 2 is a fragmentary sectional view illustrating the muffler inlet and end of the exhaust pipe;

FIGS. 3A and 3B are fragmentary sectional views illustrating the insertion and subsequent vibration of the muffler and exhaust pipe;

FIG. 4 is a fragmentary view similar to FIGS. 3A and 3B, but at the completion of the sealing operation; and FIG. 5 is a fragmentary end view illustrating the muffler inlet.

DETAILED DESCRIPTION OF A PREFERRED EMBODIMENT OF THE PRESENT INVENTION

With reference first to FIG. 1, an internal combustion engine 10 of the type typically used in automotive vehicles is there shown diagrammatically. In the well-known fashion, the exhaust products from the fuel combustion are exhausted through an exhaust pipe 12 to the exhaust system 11. This exhaust system 11 includes a muffler 14 having an inlet 16 and outlet 17 which are fluidly connected to the exhaust pipe 12.

The combustion products that are exhausted from the internal combustion engine 10 through the exhaust pipe 12 are of a very high temperature. Consequently, the exhaust pipe 12 is typically constructed of a metal or composite material. The muffler 14, on the other hand, includes an outer housing 15 that is constructed of a plastic material.

With reference now FIGS. 1, 2 and 5, the inlet 16 and outlet 17 are preferably of a one piece construction with the muffler housing 15 and thus also constructed of a thermoplastic plastic material. At least one, and preferably several axially spaced ribs 20 are formed around the inlet 16 and outlet 17 so that the ribs protrude radially inwardly relative to the inlet 16 and outlet 17. Furthermore, since the connection between the inlet 16 and the exhaust pipe 12 and the outlet 17 and the exhaust pipe 12 are the same, only the inlet 16 will be described since a like description also applies to the outlet.

The ribs 20 form an opening 22 (FIG. 5) which is complementary in shape, but smaller in cross-sectional area than the exhaust pipe 12. Furthermore, the ribs 20 are preferably V-shaped and are sufficiently malleable so that they can deflect relative to the inlet 16.

With reference now to FIGS. 3A and 3B, in order to attach the exhaust pipe 12 to the muffler housing 14, the exhaust pipe 12 is inserted into the inlet 16 from the position shown in FIG. 3A and to the position shown in FIG. 3B. Since the opening formed by the rib 20 is smaller in cross-sectional area than the outer periphery of the exhaust pipe 12, the rib or ribs 20 are deflected following the insertion as shown in FIG. 3B.

After insertion, the muffler housing 14 and exhaust pipe 12 are vibrated relative to each other in the direction of arrow 30. It does not matter whether the exhaust pipe 12 or housing 14 is held stationary while the other is vibrated, or both the housing 14 and exhaust pipe 12 are vibrated at the same time. Rather, it is only necessary that the housing 14 and exhaust pipe 12 be vibrated longitudinally, i.e. axially with respect to the axis of the exhaust pipe 12, relative to each other.

With reference now to FIG. 4, the vibration of the exhaust pipe 12 relative to the housing 14 continues for a period and at a vibration frequency sufficient to cause the ribs 20 to at least partially melt due to friction heating caused by the vibration. Once the vibration is terminated, the now partially melted ribs 20 conform to the outer periphery of the exhaust pipe 12 as shown in FIG. 4 thus completing a seal between the exhaust pipe 12 and the housing 14 in the desired fashion.

Since the ribs 20 are constructed of a thermoplastic material, upon cooling the ribs 20 regain their rigidity thus completing the seal between the housing 14 and the exhaust pipe 12.

From the foregoing, it can be seen that the present invention provides a simple yet effective muffler having a plastic housing and which is efficiently sealed to a metal exhaust pipe. Having described my invention, however, many modifications thereto will become apparent to those skilled in the art to which it pertains without deviation from the spirit of the invention as defined by the scope of the appended claims.

We claim:

1. A muffler adapted for connection with an exhaust pipe of an internal combustion engine comprising:
    an outer housing constructed of a thermoplastic plastic material, said housing having an inlet and an outlet,
    said housing having at least one inwardly protruding annular rib extending around an interior of said housing inlet, said rib being constructed of said thermoplastic material,
    wherein an opening defined by said rib is complementary in shape, but smaller in cross sectional area, than an outer periphery of the exhaust pipe so that, upon insertion of the exhaust pipe into the inlet and longitudinal vibration of said exhaust pipe relative to said housing, said rib melts due to friction heating and seals around said exhaust pipe.

2. The muffler as defined in claim 1 wherein said rib and said housing are of a one piece construction.

3. The muffler as defined in claim 1 and comprising at least two inwardly protruding ribs extending around an interior of said housing inlet.

4. The muffler as defined in claim 1 where said rib is V-shaped in cross section.

5. The muffler as defined in claim 1 wherein said rib extends continuously around said inlet.

6. The muffler as defined in claim 1 wherein said rib is circular in shape.

7. A method of attaching a muffler having a thermoplastic housing with an inlet to an exhaust pipe comprising the steps of:
    providing at least one thermoplastic rib around the housing inlet so that the rib extends inwardly around the inlet and forms an opening which is complementary in shape but smaller in cross-sectional area than an outer periphery of the exhaust pipe,
    inserting the exhaust pipe into the housing inlet,
    thereafter axially vibrating at least one of the housing and the exhaust pipe until said rib at least partially melts due to friction between said rib and the exhaust pipe,
    thereafter, stopping the vibration of said housing relative to the exhaust pipe and allowing said at least partially melted rib to cool and harden, whereupon said rib forms a seal between the housing and the outer periphery of the exhaust pipe.

8. The method of claim 7 wherein said providing step further comprises the step of providing at least two plastic ribs around the housing inlet.

* * * * *